United States Patent [19]

Murray et al.

[11]  4,328,252
[45]  May 4, 1982

[54] PRODUCTION OF PROTEIN FIBRES

[75] Inventors: E. Donald Murray, Winnipeg; Larry D. Barker, Cobourg; Brenda J. Woodman, Port Colborne, all of Canada

[73] Assignee: General Foods Inc., Toronto, Canada

[21] Appl. No.: 185,588

[22] Filed: Sep. 9, 1980

Related U.S. Application Data

[63] Continuation-in-part of Ser. No. 9,576, Feb. 5, 1979, abandoned.

[51] Int. Cl.³ ............................ A23J 1/00; A23J 3/00
[52] U.S. Cl. .............................. 426/262; 260/112 R; 260/123.5; 426/276; 426/656; 426/657; 426/802
[58] Field of Search ............... 426/104, 262, 276, 652, 426/655, 656, 657, 431, 436, 437, 456, 464, 516, 517, 518, 802; 264/178 R, 202; 260/123.5, 112 R

[56] References Cited

U.S. PATENT DOCUMENTS

| | | | |
|---|---|---|---|
| 2,331,619 | 10/1943 | Morse | 260/123.5 |
| 2,887,395 | 5/1959 | Rowe et al. | 260/123.5 X |
| 3,836,678 | 9/1974 | Leidy et al. | 426/656 X |
| 3,870,801 | 3/1975 | Tombs | 426/276 X |
| 3,953,612 | 4/1976 | Coplan et al. | 426/802 X |
| 3,987,213 | 10/1976 | Hawkins | 426/656 |
| 3,995,070 | 11/1976 | Nagasawa et al. | 426/657 X |
| 4,104,415 | 8/1978 | Shanbhag et al. | 426/802 X |
| 4,169,090 | 9/1979 | Murray et al. | 426/656 X |

OTHER PUBLICATIONS

Altschul, *Processed Plant Protein Foodstuffs*, 1958, p. 254.

*Primary Examiner*—Arthur L. Corbin
*Attorney, Agent, or Firm*—Sim & McBurney

[57] ABSTRACT

Elastic and rubbery protein fibres are formed by injection of a protein micellar mass through a screen or die into hot water or other fluid medium having a pH of about 5.5 to about 7.5 and a temperature above about 90° C. The protein fibres have characteristics rendering them useful in various food analogs.

7 Claims, No Drawings

PRODUCTION OF PROTEIN FIBRES

REFERENCE TO RELATED APPLICATION

This application is a continuation-in-part of copending U.S. patent application Ser. No. 009,576 filed Feb. 5, 1979, now abandoned.

FIELD OF INVENTION

The present invention relates to the production of protein fibres, to protein fibres produced thereby and to food products incorporating such fibres.

BACKGROUND TO THE INVENTION

In U.S. Pat. No. 4,169,090, the disclosure of which is incorporated herein by reference and assigned to the assignee of this application, and also in the corresponding Canadian Pat. No. 1,028,552 (which matured from Canadian Pat. application Ser. No. 262,397), there is described a process for the production of a unique protein isolate from various protein sources by a controlled two-step operation. In the first step, the protein source material is subjected to an aqueous food grade salt solution at a temperature of about 15° to about 35° C., a salt concentration of 0.2 to 0.8 ionic strength, and a pH of about 5.5 to about 6.5 to solubilize protein in the source material, usually in about 10 to about 60 minutes, to form a salt solubilized protein solution. In the second step, the aqueous protein solution is diluted by addition to water to decrease its ionic strength to a value less than about 0.1.

The dilution of the aqueous protein solution which may have a protein concentration, for example, up to about 10% w/v, causes association of protein molecules to form on aqueous dispersion highly proteinaceous micelles which settle in the form of an amorphous, viscous, sticky, gluten-like protein micellar mass having a moisture content of about 60 to about 75% by weight. The protein micellar mass so produced is referred to herein as PMM. The PMM exhibits a functionality not exhibited by the source material nor by an isoelectric isolate of that material.

SUMMARY OF INVENTION

In accordance with the present invention, there is provided a process for the production of rubbery and elastic protein fibres which comprises injecting wet PMM, after separation from the remaining aqueous phase, into a substantially neutral coagulating medium having a temperature of at least about 90° C. through a plurality of openings to form protein fibres by coagulation, and removing the so-formed protein fibres from the hot medium. If a single fibre is desired, a single opening may be used.

GENERAL DESCRIPTION OF INVENTION AND DESCRIPTION OF PREFERRED EMBODIMENTS

The process preferably is effected in ordinary tap water having a pH of about 5.5 to about 7.5 and at a temperature in excess of about 90° C. up to the boiling point of the water at atmospheric pressure. The fibres are produced by coagulation of the injected strands of PMM under the influence of the heat of the water bath.

The coagulation process to form the fibres in accordance with this invention also may be effected above about 100° C. in the presence of steam, and at temperatures above about 90° C. by injection into a heated bath of food grade oil. Water, however, is preferred as the fluid medium.

Generally, tap water having its natural pH is used, although some adjustment may be necessary, if the pH of the tap water is outside the range of about 5.5 to about 7.5. The invention will be described hereinafter with particular reference to tap water.

A minimum temperature of about 90° C. for the water is essential for fibre formation in this invention since temperatures below 90° C. do not produce fibres on injection of PMM into the water.

The properties of the fibres obtained using the process of this invention may be varied by varying the conditions of exposure of the injected strands in the hot water. Thus, as the temperature of the water increases, the tensile strength of the fibres increases as does the elasticity. A similar change in properties is observed, as the length of time the fibres are exposed to the hot water increases.

The diameter of the fibres obtained by the process may be varied by varying the diameter of the orifice through which the PMM is injected into the hot water. Usually, a large plurality of small diameter openings is used, such as, in a screen or die, with diameters preferably varying from about 0.05 to about 1 mm. The orifice opening size chosen depends on the desired utility of the fibres, for example, an opening size of about 0.4 mm is often found useful when meat analog fibres are desired.

The fibres are obtained in continuous elongate form which may be discrete or in bundles. When the fibres are obtained in bundles, they simulate a packet of muscle tissue. The fibres in individual form or bundles may be cut in their wet state to the length desired for a particular application.

The fibres which are produced by the process of this invention exhibit several unique and useful properties which permit the fibres to be used as an extender of or as a replacement for natural protein fibre in various food products, including human food and pet foods.

The fibres are rubbery and elastic and often have surface fibrils or sub-fibre structure which further simulate meat-like characteristics. The fibres have a high moisture content which contributes to the meat-like characteristics and may be dried without loss of structural integrity, so that they may be transported or stored in this form, and are readily rehydrated to their initial form without loss of their beneficial properties. The fibres also may be stored in frozen form for long periods without loss of their properties on subsequent thawing. Further, the fibres exhibit no structural breakdown on cooking and will withstand the high heat and pressure characteristic of retorting operations.

If desired, the fibres may be coloured by incorporating an appropriate colouring coumpound into the wet PMM before injection into the hot water.

These properties render the fibres especially useful in the production of various simulated meat and sea food analogs. The fibres impart texture and chewiness similar to natural protein fibres to a variety of food products, for example, in bacon analogs, shrimp analogs, sausage meat analogs, soups, stews and casseroles. The properties imparted by the fibres result in the good mouth-feel characteristics of natural protein fibre based products.

In some cases the fibres are used in separated or discrete form while in others the fibres are used in bound bundles. The fibres may be used as a replacement for all the natural protein fibre or as an extender of the natural protein fibre.

For some food products incorporating the fibres, it may be desirable to utilize mixtures of fibres of different diameters for the simulation of different effects. Further, since some protein sources lack certain amino acids which are present in other protein sources, fibres from mixtures of PMM's from different protein sources or mixtures of fibres formed from different source protein PMM's may be used to provide a nutritional balance.

The protein source from which the wet PMM is formed may vary widely and includes the plant proteins, for example, starchy cereals, such as, wheat, corn, oats, rye, barley and tricale; starchy legumes, such as, field peas, chickpeas, fababeans, navy beans and pinto beans; and oil seeds, such as, sunflower seed, rapeseed and soy beans; animal proteins; and microbial proteins i.e., single cell proteins. Preferably, the protein source is a plant protein owing to the readily available nature of this material.

The formation of protein fibres by the process of the present invention contrasts markedly with the procedures used in the prior art for the formation of protein fibres, wherein an alkaline dope is spun into an acid-salt bath. Thereafter, the fibrous mass must be stretched (known as "towing") to impart tensile strength thereto. In the present invention, such extremes of acid and alkali are not used, the PMM being extruded into tap water at approximately the same pH value as the PMM, and the tensile strength properties are obtained directly without stretching or further processing.

Another prior art procedure which has largely replaced the alkaline dope process is that described in U.S. Pat. No. 3,662,672. In the latter procedure, a slurry of proteinaceous material is conducted through a heat exchanger under high pressure. The procedure of this invention does not utilize high pressure, generally does not adopt as high a temperature as is preferred in this prior art (240° to 315° F.) and utilizes a starting material which is unique in itself and not disclosed in this prior art.

EXAMPLES

Example 1

Protein micellar masses (PMM's) were prepared from various protein materials utilizing the procedure described in the above-mentioned U.S. Pat. No. 4,169,090. In each case, the mass contained about 70% water and had a viscous gelatinous consistency.

The mass was loaded into a cylinder, a piston-type plunger was used to force the wet PMM through small orifices at the opposite end of the cylinder and the individual protein strands were injected into hot tap water having a pH of 7.1 wherein the strands were heat coagulated into thin threads. The threads were collected on a screen and removed from the water bath after a heat exposure of about ½ to 1 minute. In each case, the fibres were white to tan in colour and rubbery.

By varying the temperature of the bath into which the strands were injected, it was found in each case that a minimum temperature of about 90° C. was required to achieve fibre formation. It was also found that the bite resistance and chewiness of the coagulated fibres increased as the bath temperature increased above about 90° C.

The orifice sizes were varied in some instances which in turn lead to correspondingly varied fibre thicknesses. Experiments were carried out using platinum dies having openings of 0.1 and 0.4 mm, and stainless steel screens having openings of 0.6 mm. PMM's formed from the following proteinaceous materials were used:
Fababeans
Field peas
Oats
Soybeans The specific procedures used were those described in Examples 1, 3, 11 and 10 respectively of the aforesaid United States Patent. The following were the procedures used:

(a) Fababeans

Fababeans were pin milled to a fine particle size and then air classified to produce a concentrate of 53% protein (N×5.85). The proteins from this starchy legume were then extracted with an aqueous sodium chloride solution at 37° C. The dry concentrate was mixed with a 0.3 Molar sodium chloride solution (ionic strength $0.3\mu$) at a 10% w/v level, i.e., 1 part concentrate to 10 parts salt solution. The mixture was stirred for 30 minutes with no pH adjustments being necessary to hold the extract to pH 5.90±0.20. The system was then processed to remove cellular debris and starch granules by centrifugation using a continuous, desludging unit. The resulting high-salt protein extract (i.e., the supernatant) contained greater than 80% of the total seed protein originally in the air classified concentrate and had a protein concentration of about 45 mg/ml.

This extract, which was still at 37° C., was next diluted into cold tap water in a ratio of 1:3 (1 part supernatant and 3 parts of water). Immediately upon dilution, a white cloud formed in the dilution system. Due to the rapidly reduced ionic strength, dissociation of the high molecular weight aggregates (formed by salting-in) is followed by re-association into protein micelles as the C.P.C. of the micelle forming unit is achieved. A microscopic check of this cloud showed the presence of many small spheres which bound a protein specific stain (Ponceau 2R). The dilution system was allowed to stand unagitated for about 30 minutes while the protein micelles precipitated therefrom. The supernatant was then decanted and a viscous gelatinous precipitate was found in the bottom of the vessel.

(b) Field peas

Dried field peas were cleaned, milled and air classified to yield a starting protein concentrate of 52.6% (N×5.85). The concentrate was added to a 0.4 Molar sodium chloride solution at a 10% w/v level and stirred for 30 minutes at 25° C. A high-salt protein extract was prepared by centrifugation and then diluted into cold tap water at a ratio of 1:5. The resulting protein micelles were collected.

(c) Soyabeans

Commercial soybean grits (45-49% protein) were added to a solution of 0.4 M sodium chloride at a final level of 15% w/v. The system was mixed at 25° C. for 30 minutes with no pH adjustment, then particulate material was removed by centrifugation (5000×g for 10 min). The resulting proteinaceous supernatant had a pH of 6.0 and a protein concentration of 19.0 mg/ml (1.9% w/v). The supernatant was diluted with cold tap water (about 8° C.) to reduce the ionic strength of the system, and the proteins interacted to form micelles, which were observed microscopically. When the micelles were collected by settling, a viscous, gelatinous isolate was produced.

(d) Oats

High protein oats were found to form a flour of 17.8% protein (N×5.83). A 20% w/v system of flour in 0.5 Molar calcium chloride was stirred at 37° C. for 30 minutes; the reactants in this system caused the pH of the extraction to decrease out of the micelle forming range; consequently, small volumes of sodium hydroxide were added to maintain the pH at 6.3. Particulate matter was removed by centrifugation and the resulting high-salt protein extract (containing protein at 25.4 mg/ml) was dialyzed against cold water which reduced the ionic strength and caused protein micelles to form. These were collected as a P.M.M.

Example 2

Fibres formed from fababeans following the procedure of Example 1 were subjected to testing. One batch of fibres, having a moisture content of about 60%, was stored in a frozen state for six months. At the end of that period, the fibres were thawed and exhibited the same properties as prior to freezing.

Another batch of fibres was air dried. The fibres in the air dried state had a light tan colouration and were found to have a protein content in excess of 90%. The dried fibres were found to rehydrate rapidly in less than 5 minutes in water at room temperature and in less than 2 minutes in boiling water. The rehydrated fibres exhibited the same properties as prior to drying.

Some of the fibres were subjected to repeated drying and rehydration cycles which the fibres withstood without any evidence of fibre breakdown.

Example 3

The fibres formed using the procedure of Example 1 were utilized in a number of food products to replace some or all of the natural source protein.

(a) Seafood analog

Wet fababean PMM fibres of 0.4 mm diameter and 70% moisture contant were reconstituted from dry fibres and added on a 50% weight basis to a slurry of shrimp meat. After mixing, the preparation was dispensed into metal molds which had a shrimp shape. The packed molds were then heat set at 115° C. for 30 minutes with the protein in the shrimp meat acting as the food component binder.

The product was found to have the flavour and odour characteristics of the seafood fraction and the fibres imparted a fibrous texture to the product.

(b) Meatless Breakfast Sausage

A sausage substitute was prepared using the procedure described below from the following components:

| | Components | % by weight |
| --- | --- | --- |
| System I- | Egg Albumen | 4.36 |
| | Soy protein isoelectric isolate | 4.36 |
| | Sodium caseinate | 0.87 |
| | Gelatin | 2.57 |
| | Whey protein concentrate | 0.87 |
| | Sodium chloride | 0.87 |
| System II- | Water | 46.00 |
| | Liquid caramel colour | 0.30 |
| System III- | Ground TVP (texture vegetable | 3.00 |

-continued

| | Components | % by weight |
| --- | --- | --- |
| | protein) chips (soy extruded type) | |
| System IV- | PMM fibres from peas 0.4 mm diameter | 4.30 |
| | PMM fibres from peas 0.1 mm diameter | 13.00 |
| System V- | Vegetable oil (soy) | 17.0 |
| System VI- | Flavours - powdered pork | 1.00 |
| | - breakfast sausage | 0.50 |
| | - meat paste | 1.00 |

The components of system I were dry mixed for 5 minutes at speed 1 in a Kitchen Aid Mixer. System II was preheated to 50° C. and slowly added to the system I dry mix under agitation at speed 2 for 30 minutes. System V was then added to half the resulting mix under constant agitation at speed 4 for 30 minutes to result in complete emulsification. System III was added to the remainder of the system I and II mix, left to stand for 15 minutes to allow rehydration of the chips, and the two halves were then combined.

Both sizes of PMM fibres were rehydrated in 3 minutes at room temperature, excess water was removed until drip free, fibres were added to the previously prepared ingredient system and mixed for 5 minutes in a meat cutter. System VI was added and mixing was continued for a further 5 minutes. The resulting sausage substitute mix was stuffed into 21 mm edible collagen casings with a Vogt hand stuffer and tied off at desired lengths.

The resulting meatless sausages were fried over medium heat for about 10 to 15 minutes until the casings became brown and oil exuded from the product. The fired sausages had a distinctive breakfast sausage taste and a chewy meat-like texture.

The chewiness was considerably greater than a similar product prepared without the added PMM fibres and it was further observed that the meat-like texture was enhanced by the mixture of PMM fibres of different sizes, as compared with similar products prepared from one size of PMM fibres. There was no observed loss of fibre strength or texture upon processing or cooling.

(c) Chicken Consomme

Wet fababean PMM fibres of 0.4 mm diameter were cut into irregular lengths between 2.5 and 10 mm and air dried. The dried fibres were added to a dehydrated chicken broth of the cube type in a quantity of about 2.5% w/w.

Upon rehydration of the mixture with boiling water, both the broth constituents and the fibres took up water in less than 2 minutes to form a chicken broth with chicken-like fibres which exhibited stability in the hot aqueous system.

(d) Stove-top Chicken-like Casserole

Two cups of boiling water were poured into a frying pan and two tablespoons of butter were added to the water. The following ingredients were then added and thoroughly mixed:

| Component | Wt. (g) |
| --- | --- |
| Freeze dried mushrooms | 4.00 |
| Air dried green peppers | 3.00 |
| Air dried red peppers | 3.00 |
| Minced white onions | 8.00 |

-continued

| Component | Wt. (g) |
| --- | --- |
| Skim milk solids | 9.00 |
| Hydrolyzed vegetable protein | 6.00 |
| Sodium chloride | 5.00 |
| Sugar | 3.50 |
| Soya seasoning | 2.00 |
| Citric acid | 0.90 |
| Tumeric | 0.50 |
| White pepper | 0.30 |
| Celery powder | 0.20 |
| Precooked instant rice | 140.00 |
| Wet fababean PMM fibres (0.4 mm diameter) precut to about 1 cm length | 60.00 |

The mixture then was placed over medium heat and returned to a boil, covered and simmered for 5 minutes. It was found that many of the PMM fibres tended to adhere to each other giving a fibrous bundle structure. In the final cooked product, the fibres and fibre bundles gave a chicken-like appearance and texture. The fibres were stable on cooking. A gradual breakdown of fibre integrity occurred upon mastication, giving a further meat-like effect.

(e) Bacon analog

Following the procedure outlined in U.S. Pat. No. 3,840,677, the red and white phases of a bacon analog were prepared, utilizing feed pea PMM fibres of 0.1 mm diameter as the proteinaceous filler in quantities (on a dry PMM basis) of 10% by weight in the lean (red) phase and 5% by weight in the fatty (white) phase. The other components are set forth in Tables I and II of the above-mentioned patent.

As compared with a bacon analog not utilizing the PMM fibres as the proteinaceous filler, the bacon analog product obtained exhibited improved structural strength, which assisted in slicing and handling, and increased chewing texture of the cooked samples which gave a more meat-like mouth feel.

The diverse nature of the items set forth in these Examples illustrates the versatility of the PMM fibres imparting fibrous texture to a variety of simulated meat and fish products.

In summary of this disclosure, the present invention provides a process of forming protein fibres having unique and useful properties in a simple manner. Modifications are possible within the scope of the invention.

What we claim is:

1. A method for the production of protein fibres, which comprises:
   (a) subjecting a protein source material to an aqueous food grade salt solution, having a salt concentration of 0.2 to 0.8 ionic strength and a pH of about 5.5 to about 6.5, at a temperature of about 15° to 35° C. to solubilize protein in said source material and obtain a salt solubilized protein solution,
   (b) adding the salt-solubilized protein solution to water to dilute the same to an ionic strength of less than 0.1 to form an aqueous dispersion of protein micelles,
   (c) settling the protein micelles from said aqueous dispersion to form an amorphous, viscous, sticky, gluten-like protein micellar mass having a moisture content of about 60 to about 75% by weight,
   (d) separating the protein miscellar mass from the remaining aqueous phase,
   (e) injecting said separated protein miscellar mass into a hot, substantially neutral, coagulating medium, having a temperature of at least about 90° C., through a plurality of openings to form protein fibres by coagulation, and
   (f) removing the protein fibres from said hot, substantially neutral, coagulating medium.

2. The method of claim 1 wherein said hot, substantially neutral, coagulating medium is hot water having a pH of about 5.5 to about 7.5 and said hot water temperature is from about 90° C. up to the boiling point thereof at the prevailing atmospheric pressure.

3. The method of claim 1 or 2 wherein said plurality of openings each has a diameter of from about 0.05 to about 1 mm.

4. The method of claim 2 including cutting said fibres, after removal from the hot water, to desired lengths.

5. The method of claim 1 wherein said protein source material is selected from the group consisting of plant proteins, animal proteins and microbial proteins.

6. The method of claim 5 wherein said protein source material is selected from the group consisting of starchy cereals, starchy legumes and oil seeds.

7. The method of claim 1 including incorporating at least one colouring material into said protein micellar mass prior to said injection step to produce coloured fibres.

* * * * *